United States Patent [19]

Zumbé et al.

[11] Patent Number: 4,948,600

[45] Date of Patent: Aug. 14, 1990

[54] PROCESS FOR THE PURIFICATION OF A MATERIAL RICH IN COCOA DIETARY FIBER

[75] Inventors: Albert Zumbé, Neuchâtel; Thierry Schwitzquebel, La Landeron, both of Switzerland

[73] Assignee: Jacobs Suchard AG, Zurich, Switzerland

[21] Appl. No.: 306,555

[22] Filed: Feb. 6, 1989

[30] Foreign Application Priority Data

Feb. 10, 1988 [DE] Fed. Rep. of Germany ....... 3804007

[51] Int. Cl.$^5$ ............................................... A23G 1/02
[52] U.S. Cl. ......................................... 426/45; 426/52; 426/631; 426/650; 426/64; 426/593; 426/660; 426/459; 426/489; 426/659
[58] Field of Search ................... 426/45, 64, 52, 631, 426/459, 469, 489, 507, 593, 631, 650, 660, 655, 659

[56] References Cited

U.S. PATENT DOCUMENTS

| | | | |
|---|---|---|---|
| 1,650,355 | 11/1927 | Hocker | 426/45 |
| 1,650,356 | 11/1927 | Hocker et al. | 426/45 |
| 1,854,354 | 4/1932 | Wallerstein | 426/45 |
| 2,965,490 | 12/1960 | Rusoff | 426/45 |
| 4,343,818 | 8/1982 | Eggen | 426/45 |
| 4,765,994 | 8/1988 | Holmgren | 426/31 |

FOREIGN PATENT DOCUMENTS

| | | | |
|---|---|---|---|
| 0194060 | 9/1986 | European Pat. Off. | |
| 0622028 | 3/1981 | Switzerland | 426/45 |
| 0646842 | 12/1984 | Switzerland | |

*Primary Examiner*—Marianne Cintins
*Attorney, Agent, or Firm*—Burns, Doane, Swecker & Mathis

[57] ABSTRACT

The present invention relates to a process for producing a natural cocoa dietary fiber enriched material, whereby the starting material is cocoa powder. The dietary fiber-rich cocoa material is obtained by removing starch which, first, is degraded enzymatically, and then, is extracted in the form of its degradation products, followed by washing, separating and drying steps. The resulting cocoa material rich in dietary fiber is suitable for producing, for example, dietary fiber enriched chocolate, dietary fiber enriched chocolate beverages, dietary fiber enriched chocolate spread and dietary fiber enriched candy.

19 Claims, No Drawings

PROCESS FOR THE PURIFICATION OF A MATERIAL RICH IN COCOA DIETARY FIBER

DESCRIPTION

The invention relates to a process for the purification of a material rich in cocoa dietary fiber.

Recently, considerable attention has been directed towards the dietary importance of dietary fiber. Dietary fiber is generally defined as the sum of the indigestible carbohydrate and carbohydrate components of food, including cellulose, lignin, hemicelluloses, pentosans, gums and pectins. The quantity in a given food substance will vary according to the analytical method of analyses and may include resistant starches, polyphanols and tannins. For the purpose of this patent we have used the AOAC method. Dietary fibers have a very low calorie content (about 1 kilocalorie/gram) and this will depend on whether material is partially fermented in the colon.

Cocoa dietary fiber is predominant in insoluble dietary fiber. A diet rich in insoluble dietary fiber is known to exert a number of beneficient physiological effects, notably to increase intestinal transit time and stool bulk density. Dietary fiber is also space occupying, which when eaten, gives a feeling of fullness or satiety without additional calories.

Foods such as fruit and vegetables are the natural sources of dietary fiber. Dietary fiber consumption has been decreasing in developed countries since the turn of the century. It has been claimed that the incidence of a number of diseases, most notably diverticulosis, cardiovascular disease, coloric cancer and diabetes is inversely related to dietary fiber consumption. For the general population moderate increases in dietary fiber consumption are recommended.

Chocolate confectionery is a poor source of dietary fiber and enrichment with fiber would be considered favorably by nutritionists and the medical profession. There are technological limits however, because the taste, appearance and consistency of given food articles is often negatively compromised by the incorporation of purified dietary fiber.

However, we have found that purified cocoa fiber is a suitable ingredient to enrich chocolate confectionery and it can be incorporated into these products in meaningful quantities. The use of purified cocoa fiber will also reduce the calorific content of the product.

The attempts made to incorporate dietary fiber of chocolate by adding fiber conflict with limits set by legislation in many countries. In the Federal Republic of Germany the composition of chocolate is determined by the so-called Cocoa Provision. The range of permitted ingredients and additives is strictly limited therein. Even the additional cocoa fibers which originate from the cocoa shell, is not permitted.

Extraction of dietary fibers from cocoa shells is known from EP No. 68 229, for example. According to this patent the shells of the cocoa beans are subjected to wet cleaning, then dried and ground. The finely ground end product is to be added to food and luxury articles to improve the digestion promoting properties.

Experiences with cocoa shells for animal fodder (illnesses appeared among the animals) as well as legislation in many countries argues against the use of cocoa shells for increasing the fiber content of foods.

The processing of cocoa, using cereals for dietary fiber, to prepare confectionery sweets, is well known.

For example, in CH-PS 646 842 a product based on cocoa is described which is mainly produced from bran (for the source of dietary fiber) and cocoa powder. This type of product cannot be designated as pure chocolate in the true sense because of its organoleptic properties and because of possible legal statutes.

Commercially available chocolate, because of its recipe, contains extremely small quantities of cocoa dietary fiber in the order of 1-2% by weight and comes from the cocoa mass. It is conceivable that increasing the proportion of these cocoa's own dietary fibers would result in the production of a dietary fiber enriched chocolate that also complies with legislation. However, enriching said dietary fibers is a problem unsolved hitherto.

The objective of the present invention, therefore, is to provide a process for the purification of a material rich in cocoa dietary fiber, whereby this material is suitable for producing dietary fiber enriched chocolate, candy and chocolate beverages.

This objective is achieved in a surprisingly simple way. The cocoa powder serves as the basis for producing material rich in dietary fiber. The cocoa powder is subjected to enzymatic treatment to degrade the starch contained therein. The degradation products obtained are removed and the remaining cocoa material rich in dietary fiber is subjected to washing, separating and drying steps for cleaning purposes. Preferably, the enzymatic treatment is effected with $\alpha$-amylase. It is especially advantageous to suspend the cocoa powder in a solvent before enzymatic treatment. The solvent is preferably selected in such a way that the starch degradation products are soluble therein and, in soluble form, can be easily separated from the insoluble material rich in dietary fiber. Water and ethanol have proven to be especially suitable solvents. They each can be used singly or in combination. During formation of the suspension small amounts of soluble constituents contained in the cocoa powder pass over in the solvent. In addition, soluble substances generated during the starch hydrolysis also pass into the solvent phase. The enzymatic hydrolysis using $\alpha$-amylase is directed toward the starch contained in cocoa powder. Starch is split into glucosidic saccharide elements which are soluble in water and water-alcohol mixtures. The fat content of the cocoa powder employed is critical for the success of the process. Preferably, it should not exceed 20% by weight.

In principle, the process according to invention can be applied to pressed cake, too. Pressed cake is prepared according to traditional cocoa technology, i.e. cocoa beans are cleaned, peeled to remove the shells, roasted and broken up (this material is called cocoa nibs), then ground to a particle size in the order of 50 microns diameter (this material is called cocoa liquor) and finally cocoa butter is partially extracted. Pressed cake has a minimum cocoa butter content of 8% fat. The high fat content of cocoa liquor can adversely effect on the enzyme hydrolysis. An essential advantage of using cocoa powder as opposed to pressed cake is the considerably smaller particle size of the cocoa powder (most particles are 10-20 microns in diameter). The accessibility of the $\alpha$-amylase to the starch is facilitated by small particles of cocoa powder. This fact is probably the main reason for the especially favourable results when applying the process to cocoa powder.

Customarily, a commercially available cocoa powder with a fat content of 10 to 20% is used. It is more advantageous, however, to use a cocoa powder with a fat content of less than 10%.

Preferably, a suspension of cocoa powder, 10 to 30% by weight, is produced in water and/or an ethanol-water mixture for carrying out the claimed process. The pH value of this suspension differs according to the type of cocoa powder used (alkalized or non-alkalized) and, by using acids or bases, is adjusted to a pH value between 5.5 and 8.0. The acids or bases used for adjusting the pH value must be of the proper type and must be safe for foods. Potassium hydroxide, sodium hydroxide, calcium hydroxide, phosphoric acid, citric acid, for example, are used preferably.

Heat-resistant α-amylase of commercial quality is added, together with an enzyme stabilizer, to the suspension of cocoa powder with a solvent. During the reaction (digestion) the suspension is kept at an increased temperature (between 20° C. and 90° C.). The reaction time lies between 30 minutes and 5 hours. The duration of the treatment process is dependent on the equipment available. If the available equipment is laid out for large quantities and low temperatures, then longer treatment periods result. At higher temperatures the treatment time is shorter.

The concentration of α-amylase in the suspension is selected, contingent on the desired reaction time. Generally, the rule is that a longer hydrolysis time is required for lower concentrations. The use of a α-amylase solution with an activity of 60 kilo units (KNU)/g in concentrations of 0.1 to 1.5%, in relation to the cocoa powder employed, has proven to be advantageous.

1 KNU denotes the amount of enzyme degraded by 5.26 g starch (Merck, Amylum solubile ERG B 6) per hr in the following composition:

| Substrate (reactant) | soluble starch |
|---|---|
| ($Ca^{2+}$) | 0.0043 M |
| Reaction time | 7 to 20 min. |
| Temperature | 37° C. |
| pH value | 5.6 |

The suspension present at the end of the reaction time is subjected either to pressure filtration, using classical pressure-filtration equipment or to continuous centrifuging, using a horizontal centrifuge, for example. The remaining solid portion is washed to remove clinging soluble substances. Cleaning solvents are chosen from the water, ethanol, methanol and acetone group.

The washed, solid residue (solid cake) is dried. Here, preferred operation is at reduced pressure and at temperatures between 30° C. and 110° C. The dried solid residue varies in its composition, depending on the cocoa powder selected as original material and the test conditions, such as digestion time, washing processes and washing liquids within the following limits indicated:

| dietary fiber | 35 to 75% by weight |
|---|---|
| denatured protein | 15 to 27% by weight |
| ash | 2.5 to 9.1% by weight |

The rest of the "solid cake" is digestible material in accordance with the AOAC-diet-fiber-analysis method.

The invention is explained more fully by the following examples:

EXAMPLE 1

15 kg cocoa powder (fat content: 10 to 12% by weight) are suspended in 135 kg water. The mixture is stirred vigorously. Then follows the addition of 90 g calcium hydroxide and 150 g of a heat-resistant α-amylase solution. The suspension is heated to 90° C. such that a temperature increase of 2° C. per minute is not exceeded. The reaction temperature of 90° C. is maintained for an hour. Following this digestion period the suspension is cooled to 70° C. Solids and liquids are separated by means of pressure filtration (3 bar variation). The solid portion is suspended in 60 kg acetone; separation is effected by using the same equipment described above. The remaining solid cake is dried now under a vacuum at 40° C. The end product is a dietary fiber enriched cocoa material with the following composition:

| 5.49 kg | dietary fiber |
|---|---|
| 2.43 kg | non-enzymatic degradable protein |
| 0.81 kg | ash. |

This dietary fiber enriched cocoa material is suitable for producing different sorts of high-fiber chocolate (i.e. dark chocolate and milk chocolate) notably for moulded chocolate and couverture. It can also be used for cocoa beverages, chocolate spread, candy bars and baked goods.

EXAMPLE 2

The process is analogous to the process described in Example 1, however, the starting material used is pressed cake. The resulting end product is consistent with the end product described in Example 1 regarding its composition and may be used for producing the same products.

EXAMPLE 3

5 kg non-alkalized cocoa powder are suspended in a solution of 19.75 kg ethanol an 5.25 kg water. 31.5 g of calcium hydroxide is added. The α-amylase and the corresponding stabilizer are added in compliance with the enzyme manufacturer's recommendations.

The suspension temperature is increased to 45° C. and is held constant for 5 hours, while stirring vigorously. Next, separation through filtration is effected at 1 atmosphere filtration pressure.

The solid portion is then dried at 103° C. The fiber-rich cocoa material is ground and used to produce the products named in Examples 1 and 2.

Utilization of the resulting dietary fiber-rich material form cocoa, as per invention, for the production of fiber enriched chocolate and chocolate products is described in the following example:

EXAMPLE 4

Milk chocolate rich in dietary fiber

A mixture of 15 kg dry, cocoa fiber rich material, produced according to invention, with 7.9 kg cocoa liquor, 25.3 kg cocoa butter, 50.3 kg white sugar, 25 kg whole milk powder, 17.5 kg low fat milk powder and 0.15 kg lecithin is produced. This mixture is kneaded by utilizing a shear mixture and is then worked in a 5-cylinder refiner.

The resulting fine powder is transfered to a Suchard conch and then treated like customary chocolate. Complete liquefication of the dietary fiber-rich milk chocolate is achieved by adding 8.9 kg cocoa butter and 0.4 kg lecithin during conching.

The resulting liquid, dietary fiber-rich milk chocolate is tempered and molded in the devices for normal chocolate.

The dietary fiber-rich milk chocolate end product obtained is very pleasant in taste and quality. Its colour is considerably darker than normal milk chocolate and in taste it comes very near to that of dark chocolate.

EXAMPLE 5

Dietary fiber-rich candy bar 22.7 kg of the dietary fiber-rich cocoa material, produced according to invention, are mixed with 0.22 kg lecithin and 13.1 kg milk fat in a shear mixer. This mixture is treated in a 3-cylinder refiner.

The resulting powder is kneaded in a shear mixer with 7.3 kg cocoa powder (fat 10 to 12% by weight), 31.8 kg fine sugar, 25.1 kg fats and flavourings.

11 kg rice flakes and 21.4 kg corn flakes are carefully folded into the resulting liquid mass with its high cocoa-fiber content. The crispy, dietary fiber-rich mass is then molded into small bars over 5.7 kg of waffles. To solidify the mass the bars are cooled and then partially covered with 20.25 kg dark chocolate coating.

The end product is a 20 g bar which is rich in natural cocoa-fiber content.

EXAMPLE 6

Fiber enriched instant cocoa beverage 5 kg of the dietary fiber-rich material, obtained in accordance with the invention, are crushed and mixed with 10 kg cocoa powder containing lecithin (10 to 12% fat by weight) and 35 kg fine sugar.

The dry mixture is then agglomerated, whereby the powder is sprayed in a steam bed—in accordance with the standard conditions of agglomeration.

The end product is a dietary fiber-rich instant cocoa beverage which tastes good and only differs from a normal instant cocoa beverage in its somewhat darker colour.

We claim:

1. Process for the purification and use of a cocoa powder containing cocoa dietary fibers comprising:
    treating the cocoa powder to remove starch, whereby first the starch is degraded enzymatically and then is extracted in the form of starch degradation products, thereby leaving a solid portion, washing the solid portion, effecting separation of the solid portion, drying the solid portion to form a product containing 35% to 75% cocoa dietary fibers, and
    incorporating the product in chocolate, candy or cocoa beverages.

2. Process according to claim 1, wherein the enzymatic degradation of starch is effected by α-amylase.

3. Process according to claim 2, wherein the cocoa powder is subjected to enzymatic treatment in a solvent while in a suspension, whereby the starch degradation products obtained are soluble.

4. Process according to claim 3, wherein the suspension contains cocoa powder from 10 to 30% by weight.

5. Process according to claim 4, wherein the solvent is water or ethanol or a water-ethanol mixture.

6. Process according to claim 5, wherein the cocoa powder has a fat content of 20% maximum.

7. Process according to claim 6, wherein the suspension has a pH value of 5.5 to 8.0.

8. Process according to claim 7, wherein the enzymatic starch degradation is effected at temperatures between 20° C. and 90° C.

9. Process according to claim 8, wherein washing is carried out while using water, acetone or a combination of water and acetone.

10. Process according to claim 9, wherein the separation is effected by pressure filtration or contrifugation.

11. Process according to claim 1, wherein the cocoa powder is subjected to enzymatic treatment in a solvent while in a suspension, whereby the starch degradation products obtained are soluble.

12. Process according to claim 11, wherein the suspension contains cocoa powder from 10 to 30% by weight.

13. Process according to claim 11, wherein the solvent is water or ethanol or a water-ethanol mixture.

14. Process according to claim 1, wherein the cocoa powder has a fat content of 20% maximum.

15. Process according to claim 1, wherein the suspension has a pH value of 5.5 to 8.0.

16. Process according to claim 1, wherein the enzymatic starch degradation is effected at temperatures between 20° C. and 90° C.

17. Process according to claim 1, wherein washing is carried out while using water, acetone or a combination of water and acetone.

18. Process according to claim 1, wherein the separation is effected by pressure filtration or contrifugation.

19. A fiber-rich chocolate product comprising cocoa powder, sugar and a material comprising 35% to 75% natural cocoa dietary fibers.

* * * * *